US012791815B2

(12) United States Patent

Dura

(10) Patent No.: US 12,791,815 B2
(45) Date of Patent: Nov. 10, 2026

(54) STRAIN RELIEF DEVICE FOR A CABLE

(71) Applicant: Phoenix Contact GmbH & Co.KG, Blomberg (DE)

(72) Inventor: Artur Dura, Wielen (PL)

(73) Assignee: PHOENIX CONTACT GMBH & CO. KG, Blomberg (DE)

( * ) Notice: Subject to any disclaimer, the term of this patent is extended or adjusted under 35 U.S.C. 154(b) by 257 days.

(21) Appl. No.: 18/656,745

(22) Filed: May 7, 2024

(65) Prior Publication Data

US 2024/0377604 A1 Nov. 14, 2024

(30) Foreign Application Priority Data

May 9, 2023 (DE) ..................... 10 2023 112 114.6

(51) Int. Cl.
*G02B 6/44* (2006.01)

(52) U.S. Cl.
CPC ..... *G02B 6/44765* (2023.05); *G02B 6/44785* (2023.05)

(58) Field of Classification Search
CPC ........................ G02B 6/44765; G02B 6/44785
See application file for complete search history.

(56) References Cited

U.S. PATENT DOCUMENTS

| | | | | |
|---|---|---|---|---|
| 3,638,169 A * | 1/1972 | Caveney | H01R 13/5804 | 439/471 |
| 3,792,417 A | 2/1974 | Punako | | |
| 6,419,519 B1 * | 7/2002 | Young | H01R 13/5812 | 439/446 |
| 11,349,254 B2 | 5/2022 | Reibel et al. | | |
| 2016/0240954 A1 * | 8/2016 | Grudzewski | H01R 13/582 | |

FOREIGN PATENT DOCUMENTS

| | | |
|---|---|---|
| DE | 2335527 A1 | 4/1974 |
| EP | 2975311 B1 | 1/2016 |
| GB | 721872 A | 1/1955 |

* cited by examiner

*Primary Examiner* — Chad H Smith
(74) *Attorney, Agent, or Firm* — LEYDIG, VOIT & MAYER, LTD.

(57) ABSTRACT

A strain relief device for a cable includes: two identically or similarly configured halves, each half of the halves having a clamping portion comprising separately formed and identically configured retaining members mountable via an attachment portion to a body and/or housing connectable to the cable. The attachment portion is spaced apart from the clamping portions. The clamping portions are configured to allow the cable to be clamped therebetween.

18 Claims, 4 Drawing Sheets

STRAIN RELIEF DEVICE FOR A CABLE

CROSS-REFERENCE TO PRIOR APPLICATION

Priority is claimed to German Patent Application No. DE 10 2023 112 114.6, filed on May 9, 2023, the entire disclosure of which is incorporated by reference herein.

FIELD

The invention relates to a strain relief device for a cable and to an assembly including such a strain relief device.

BACKGROUND

Strain relief devices are used in various fields of application to secure a cable and prevent damage to the cable or to a connection or a cable lead-through.

A particularly simple way of providing a strain relief is to pass the cable through an elastic ring that is pressed against the cable by a threaded union. For this purpose, flexible elements may be provided which are pressed against the elastic ring by a threaded union, thereby compressing it. Such an approach is simple and suitable for relatively low tensile forces. However, higher tensile forces cannot be held in this way.

U.S. Pat. No. 11,349,254 B2 describes a strain relief device including two pieces which are pivotably connected to each other by a hinge and which together have an internal thread to be threaded onto an external thread. One of the pieces has ear portions formed thereon to which clamping pieces can be fixed to secure a cable. This approach is capable of resisting high tensile forces but complex to manufacture and, in addition, is only suitable for certain applications.

EP 2 975 311 B1 describes a strain relief device where a body having an external thread is connected via a film hinge to two segments which are connected to each other via another film hinge. The two segments can be latched together to engage in a groove of a corrugated conduit and to thereby secure the same against tensile strain. This approach is also complex to manufacture and suitable only for a limited number of applications.

U.S. Pat. No. 3,638,169 A relates to a strain relief device including two pieces which are pivotably connected to each other by film hinges and together have an internal thread to be threaded onto an external thread, and which can be externally mounted with a cable binder to a part having an external thread. Tongues projecting toward the cable can be lashed tightly to a cable with another cable tie. This approach is suitable for higher tensile forces only with sufficiently tightly mountable cable binders and is prone to failure in use. DE 2 335 527 A1 describes a similar approach with a rigid nut, which has the same disadvantages. GB 721,872 A describes another strain relief device which is of basically similar design and where a screw clamp is provided for fixation to the cable. This design is capable of withstanding very high tensile forces, but is also very complex to manufacture.

SUMMARY

In an embodiment, the present invention provides a strain relief device for a cable, comprising: two identically or similarly configured halves, each of the halves having a clamping portion comprising separately formed and identically configured retaining member mountable via an attachment portion to a body and/or housing connectable to the cable, wherein the attachment portion is spaced apart from the clamping portions, and wherein the clamping portions are configured to allow the cable to be clamped therebetween.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
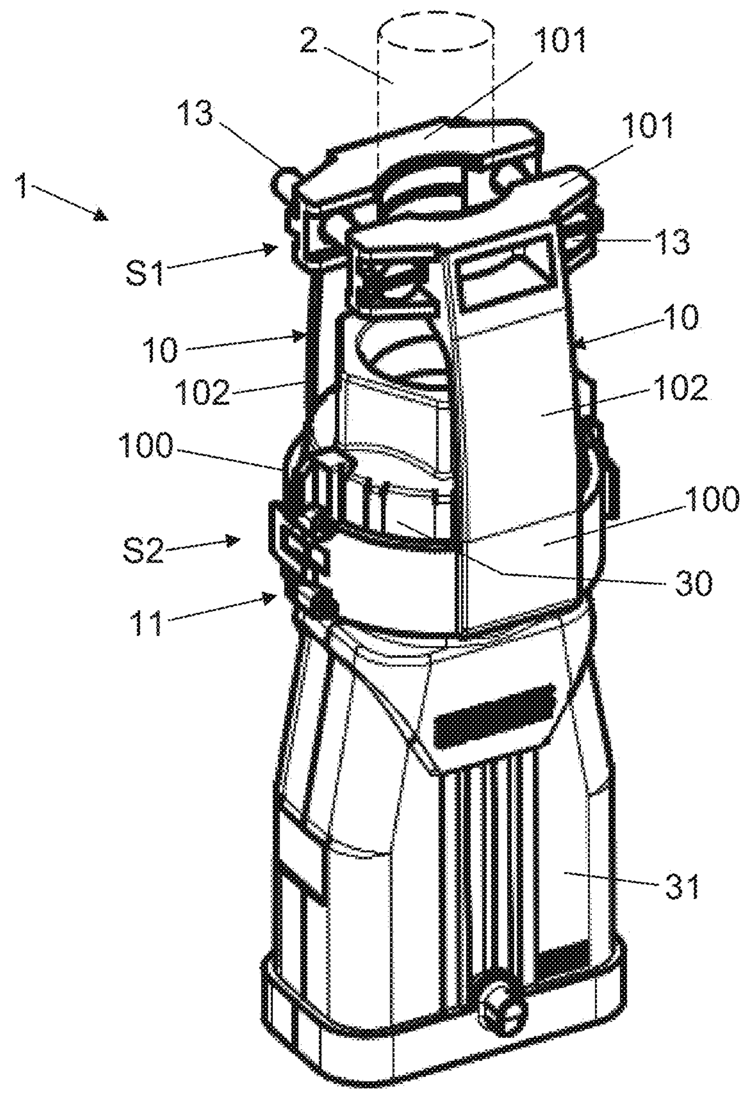
FIG. 1 is a view of an assembly including a housing with a nut and a cable connected thereto, and further including a strain relief device for the cable.
Figure 2:
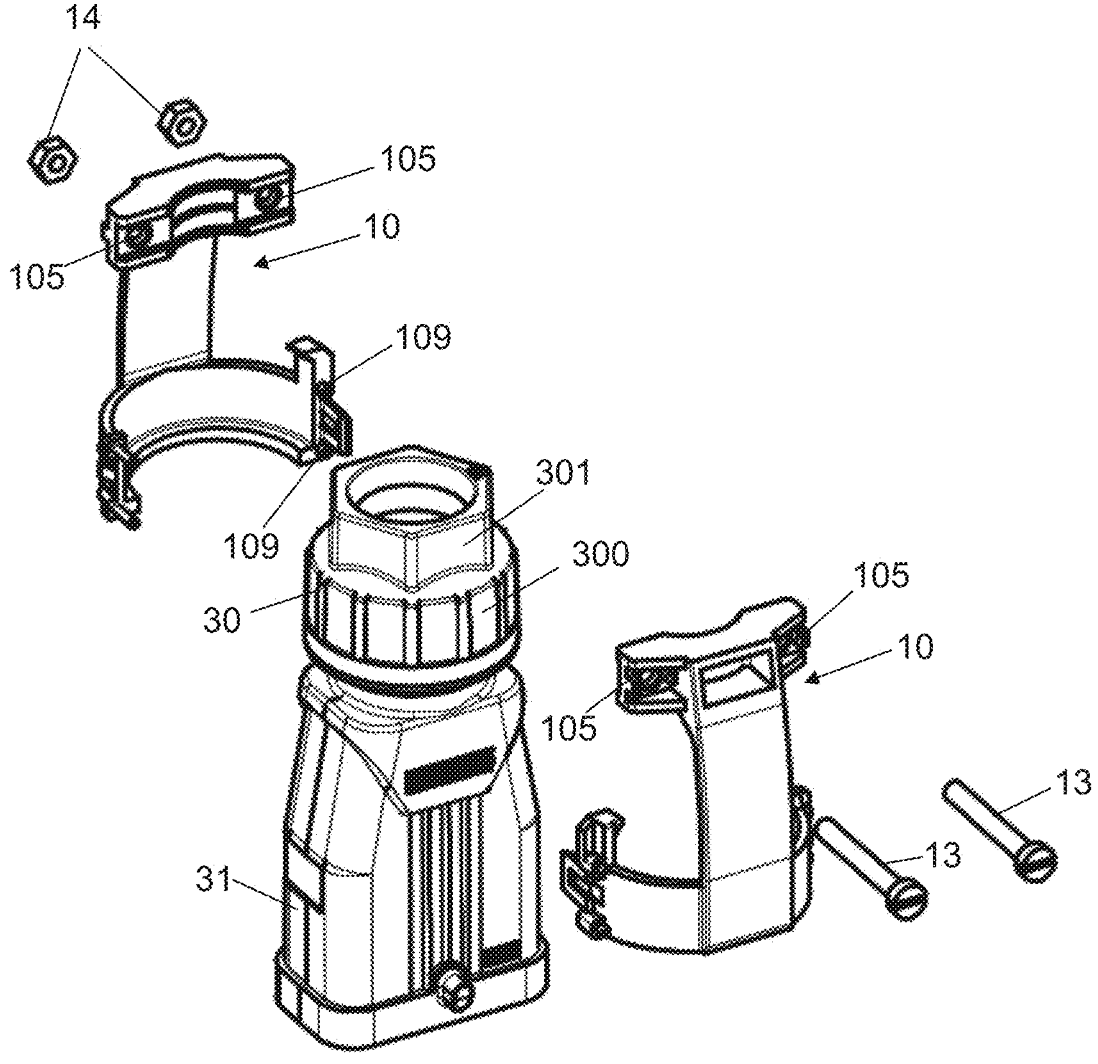
FIG. 2 is a view of the assembly of FIG. 1, with the strain relief device illustrated in exploded view.
Figure 3:
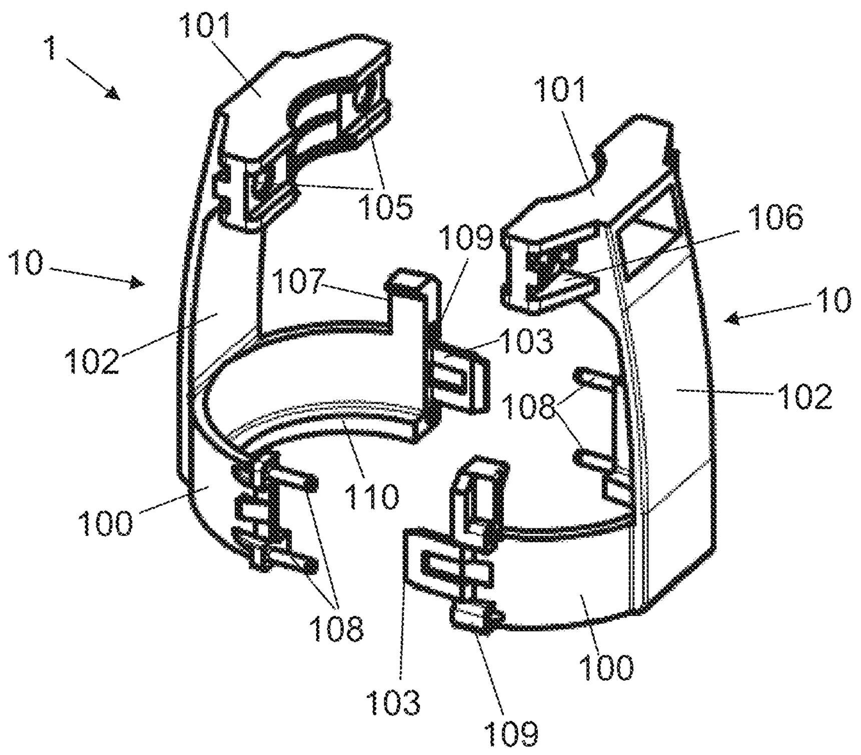
FIG. 3 is a view showing two retaining members of the strain relief device according to FIGS. 1 and 2.

In an embodiment, the present invention provides a strain relief device that is simple to manufacture and, at the same time, capable of withstanding the highest possible tensile forces.

Accordingly, a strain relief device includes two identically or similarly configured halves, each having a clamping portion, or two separately formed and identically configured retaining members, each having a clamping portion, which can be mounted via an attachment portion to a body or housing connectable or connected to the cable, the attachment portion being spaced apart from the clamping portions, and the clamping portions being configured to allow the cable to be clamped therebetween (so the cable can be clamped between the clamping portions at a location that is offset along the cable from the attachment portion).

This is based on the idea of using components which are particularly simple to manufacture and particularly easy to connect together. The retaining members, for example, are identical parts, so that only a single tool is required to manufacture the two retaining members. The attachment portion may, for example, simply be placed on a nut. Alternatively, the retaining members may be two halves integrally connected together, for example, via a film hinge, so that in this case, too, only a single tool is needed.

Each of the retaining members may have a retaining portion and/or a connecting portion. It may be provided that the retaining portion of each of the retaining members is connected to the respective clamping portion via the corresponding connecting portion. This allows convenient mounting and clamping at an easily accessible location.

The retaining portions of the retaining members may together form the attachment portion. For example, each of the retaining portions provides one half of the attachment portion. This allows for particularly easy mounting.

The retaining portion of each of the retaining members may have at least one guide element and/or at least one guide receptacle. The at least one guide element of each of the two retaining members may be engageable with the at least one guide receptacle of the other of the two retaining members. This enables a simplified and secure connection.

The retaining portion of each of the retaining members may have a latching-type connecting element latchingly engageable with a mating latching-type connecting element (e.g., of the respective other retaining member) to create a respective latching connection. For example, each of the retaining members includes both a latching-type connecting element and a mating latching-type connecting element. This enables particularly easy assembly and a small number of individual parts.

The attachment portion may be formed by a retaining ring. The retaining portion of each of the retaining members is optionally designed to be mountable to the retaining ring. In this way, particularly high tensile forces can be held.

For example, the retaining portion of each of the retaining members is latchable to the retaining ring by means of a latching connection. This enables easy and quick assembly.

The connecting portion may be flexible. This makes it possible to compensate for different cable cross sections.

The attachment portion forms a circumferential shoulder, for example. This enables secure retention to the body optionally mounted on the cable.

Optionally, the attachment portion is annular in shape. This enables a variety of applications.

It may be provided that the clamping portion of each of the retaining members has one hole or two holes. This allows a cable to be particularly securely clamped in place, for example, by means of one or two screw(s) passed through the hole(s).

Optionally, two screws can be passed through two respective opposite holes in the two retaining members. In this way, particularly large tensile forces can be held.

The screws may be threadedly engageable by nuts to tighten the clamping portions against each other. The clamping portions may have form-fit portions for non-rotatably receiving the nuts. This allows for particularly easy mounting.

Each of the retaining members is formed, for example, as a single piece. This allows for particularly easy manufacture.

According to one aspect, there is provided a strain relief device for a cable, which strain relief device may optionally be configured according to any of the above-described embodiments. The strain relief device includes two retaining members, each having a clamping portion and capable of being mounted via an attachment portion to a body and/or housing that is connectable to the cable, and in such a manner that the cable can be clamped between the clamping portions, the retaining members being fixable relative to each other by at least two latching connections.

It is thus possible to use components which are particularly simple to manufacture and particularly easy to connect together. The retaining members are, for example, identical parts, so that only a single tool is required to manufacture the two retaining members. The attachment portion may, for example, simply be placed on a nut.

The retaining members are, for example, latchable together by means of the at least two latching connections. This allows for a particularly small number individual parts and for simplified assembly.

According to one aspect, there is provided an assembly including a body which can be mounted on a cable and/or a housing which can be mounted on a cable, and further including the strain relief device according to any of the embodiments described herein.

The body may be mounted on the cable. The strain relief device may be mounted on the body and/or housing by means of the attachment portion. The cable may/can be clamped between the clamping portions that are tightened against each other.

Optionally, the body is configured in the form of a nut which is threaded to the housing.

FIG. 1 shows an assembly 3 including a body 30, a cable 2, and a strain relief device 1.

Body 30 is here configured in the form of a nut which is screwed onto a housing 31. In the example shown, housing 31 is a connector part capable of being pluggingly connected to a corresponding mating connector part, but it could also be, for example, a cable lead-through or the like.

Cable 2 is illustrated here only with dashed lines. Cable 2 extends through body 30. Specifically, cable 2 extends through body 30 into housing 31. In the present case, cable 2 is, by way of example, an electrical cable.

Strain relief device 1 has an attachment portion 11 by which it is fixed to body 30. Strain relief device 1 is held, via attachment portion 11, to body 30 in the axial direction along the extent of cable 2, and specifically, in the example shown, by a form fit.

Strain relief device 1 includes two halves in the form of retaining members 10. Retaining members 10 are separate components and are mounted to each other. Retaining members 10 are identical in configuration and each have a clamping portion 101. It should be noted, however, that retaining members 10 may alternatively also be formed as a single piece and may be connected together, for example, via a film hinge. Furthermore, retaining members 10 may also be configured similarly (instead of identically). For example, retaining members 10 have the same basic shape and/or differ only in certain regions.

Clamping portions 101 can be mounted (and, according to FIG. 1, are mounted) via attachment portion 11 to the body 30 connected to cable 2 and in such a way that cable 2 can be clamped between clamping portions 101 at a location S1 that is offset from attachment portion 11 along cable 2, i.e., in the axial direction. Attachment portion 11 is disposed at another location S2. Location S1 and the other location S2 are spaced apart in the axial direction.

Further details of strain relief device 1 will now be described in more detail with reference to FIGS. 1 through 4.

Each of retaining members 10 is formed as a single piece from a unitary material. Retaining members 10 are composed of, for example, a plastic material, or alternatively of a metal, for example aluminum. Retaining members 10 are injection-molded parts. Retaining members 10 are manufactured using a simple open-close mold without a sliding core.

Strain relief device 1 is capable of securely retaining cable 2, even under tensile forces of more than 300 N, in this case more than 500 N. Specifically, strain relief device 1 is capable of retaining the cable under a tensile force of (at least) 667 N for (at least) 1 minute, a displacement of the cable relative to body 30 being (no more than) 2.4 mm.

Clamping portions 101 each have a recess for cable 2. The recess is defined by several (here three) ribs extending parallel to each other. This makes it possible to hold a particularly high tensile force as compared to a curved flat surface.

A hole 105 is formed on both sides of the recess of each clamping portion 101. Holes 105 are offset from each other in a direction perpendicular to the longitudinal extent of the connected cable 2. When strain relief device 1 is in an assembled state, clamping portions 101 are disposed relative to each other such that the respective holes 105 are aligned with each other. Thus, a screw 13 can be inserted through a respective aligned pair of holes 105 and threadedly engaged by a respective nut 14. In the present case, nuts 14 are hexagonal in shape. At holes 105, form-fit portions 106 are formed, here in the form of two parallel extending surfaces. Nuts 14 can be inserted between the respective form-fit portions 106 so as to be thereby non-rotatably retained in position. This allows screws 13 to be tightened in a particularly simple way without having to separately hold the nuts in place. Alternatively, it would also be possible to use screws that cut into the material of clamping portions 101 at holes 105, thereby eliminating the need for the nuts.

Each of retaining members 10 further has a retaining portion 100 and a connecting portion 102. The retaining portion 100 of each retaining member 10 is connected to the respective clamping portion 101 via a respective connecting portion 102. In the assembled state, connecting portions 102 extend along the longitudinal extent of cable 2. Optionally, connecting portions 102 are inclined toward each other in the direction of clamping portions 101, as illustrated in the figures. Connecting portions 102 are elastically flexible. In the present case, connecting portions 102 are each configured in the form of a flat strip. This allows connecting portions 102 to be bent toward each other or away from each other so as to compensate for different cable cross sections.

Figure 4:
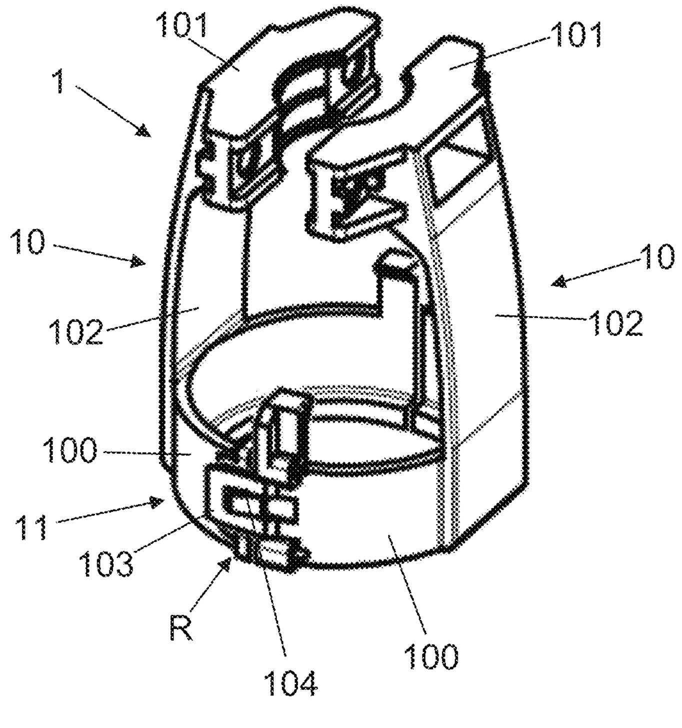
FIG. 4 is a view showing the two retaining members of FIG. 3 secured together.

As can be seen particularly from FIGS. 1 and 4, retaining portions 100 of retaining members 10 together form attachment portion 11. In the present case, each of retaining portions 100 describes a semicircle. Retaining portions 100 together form the shape of a ring. In the assembled state, attachment portion 11 has a circumferential shoulder 110. In the present case, shoulder 110 is formed at an end of retaining portions 100 opposite the respective clamping portion 101. Shoulder 110 is formed on an inner side of retaining portions 100. Thus, an inner width at shoulder 100 is reduced in comparison to adjacent regions of retaining portions 100. The inner diameter at step 110 is smaller than the outer diameter of a portion of body 30, which is here configured as a threaded portion 300 (see, e.g., FIG. 2). In contrast, the adjacent regions of retaining portions 100 have an inner diameter that is equal to or greater than the outer diameter of threaded portion 300. This allows the two retaining members 10 to be laterally engaged onto body 30. In the assembled state, strain relief device 1 is thus form-fittingly secured on body 30 against movement relative thereto in the axial direction (along the direction of pull on cable 2).

The body has an internal thread on the inner side of threaded portion 300. Via the internal thread, body 30 is threaded onto an external thread of housing 31. Body 30 further has a form-fit portion 301 (here a hexagon) at which body 30 can be screwed onto the thread of housing 31 using a tool.

In order to prevent strain relief device 1 from being axially displaced in the opposite direction (i.e., axially in a direction opposite to the direction of pull on cable 2), the retaining portion 100 of each of retaining members 10 has a securing portion 107. Securing portions 107 are each configured in the form of an arm and each project in the axial direction from the respective retaining portion 100. Each securing portion 107 has an inward projection at its end, and thus embraces threaded portion 300 on the side opposite shoulder 110. Thus, strain relief device 1 is secured to body 30 such that it is restrained from displacement relative thereto in the opposite axial directions. However, shoulder 110 has a larger contact surface than securing portions 107 and can therefore withstand greater forces.

In order to allow easy assembly of the two retaining members, they each have a latching-type connecting element 103 and a mating latching-type connecting element 104. Latching-type connecting element 103 and mating latching-type connecting element 104 are each formed on retaining portion 100 of each retaining member 10, and specifically in this case at opposite ends of retaining portion 100. Thus, the two pairs of a latching-type connecting element 103 and a mating latching-type connecting element 104 can each be latched together so as to fix the two retaining members 10 together.

In the present case, latching-type connecting element 103 is configured in the form of a tab: mating latching-type connecting element 104 is configured in the form of a latching edge having an entry bevel. FIG. 4 shows the latched state in which latching-type connecting elements 103 and mating latching-type connecting elements 104 have formed two latching connections R.

In strain relief device 1, retaining members 10 can thus be fixed relative to each other by means of at least two latching connections R. To this end, in the present case, retaining members 10 can be directly latched together by means of the at least two latching connections R. When latched together, retaining members 10 are then in contact with each other, specifically at their retaining portions 100.

In order to facilitate the attachment of the two retaining members 10 to each other, the retaining portion 100 of each of retaining members 10 has at least one guide element 108 and at least one guide receptacle 109. In the present case, the retaining portion 100 of each of retaining members 10 has two guide elements 108 and two guide receptacles 109. Retaining members 10 are configured such that the guide elements 108 of each of the two retaining members 10 are engageable with the guide receptacles 109 of the other of the two retaining members 10. In the example shown, guide elements 108 are configured in the form of pins, and guide receptacles 109 in the form of matching holes. Guide elements 108 and guide receptacles 109 facilitate the proper arrangement of retaining members 10 relative to each other and assist in latching retaining members 10 together.

Thus, strain relief device 1 can be mounted on body 30 particularly easily by simply placing the two retaining members 10 from opposite sides around body 30 and latching them together. The cable 2 extending through body 30 can then be secured by tightening clamping portions 101 with screws 13 and nuts 14 from both sides against cable 2.

Figure 5:
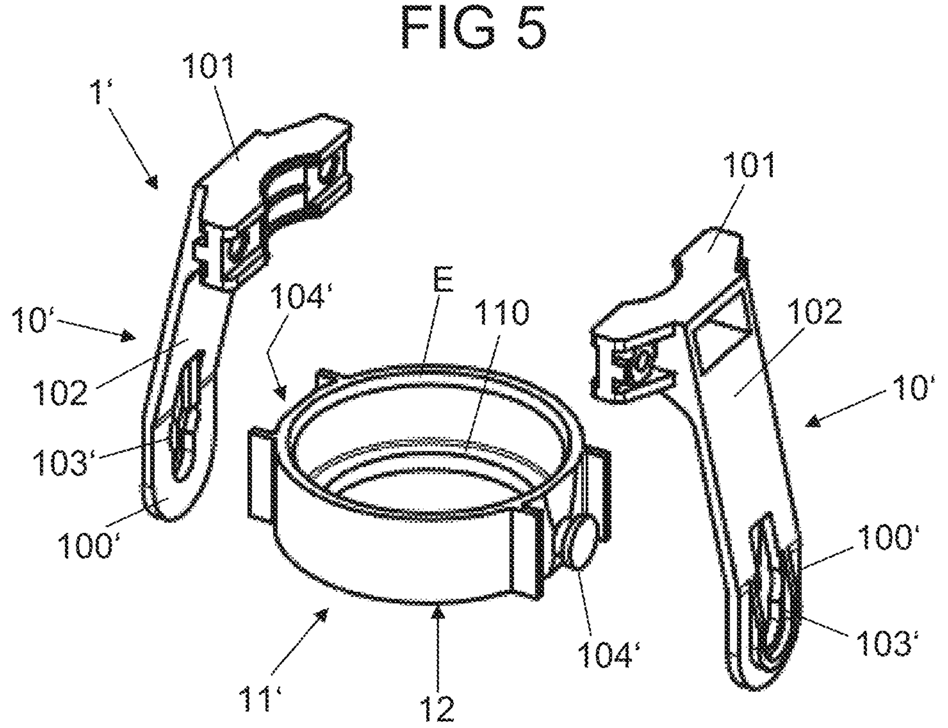
FIG. 5 is a view of a strain relief device for the housing with the nut and the cable connected thereto according to FIG. 1, which strain relief device includes a retaining ring and two retaining members connectable thereto.
Figure 6:
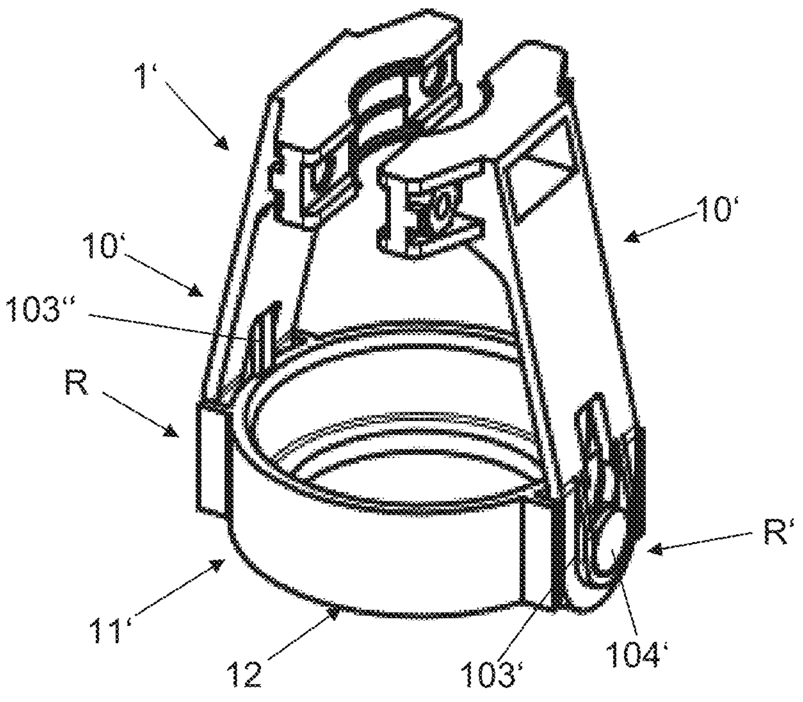
FIG. 6 is a view of the assembly of FIG. 5, showing the two retaining members attached to the retaining ring.

FIGS. 5 and 6 show a possible embodiment of a strain relief device 1' having two retaining members 10' and a retaining ring 11. Clamping portions 101 are configured as described above with reference to FIGS. 1 through 4, and connecting portions 102 also have a corresponding function.

However, the strain relief device 1' according to FIGS. 5 and 6 differs therefrom in that attachment portion 11' is formed by retaining ring 12, the retaining portion 100' of each of retaining members 10' being mountable to retaining ring 12. In the present case, provision is made for the retaining portion 100' of each of retaining members 10' to be latchable to retaining ring 12 by a latching connection R.

For this purpose, retaining ring 12 is provided on both sides with a mating latching-type connecting element 104' with which a respective latching-type connecting element 103' of each retaining member 10' can be latchingly engaged. Latching-type connecting elements 103' of retaining members 10' are formed on the retaining portion 100' of the respective retaining members 10'. In this case, latching-type connecting elements 103' of retaining members 10' are each configured in the form of an opening, in which or to which a respective mating latching-type connecting element 104' in the form of a mushroom head can engage and latch. Thus, the retaining portion 100' of each of retaining members 10 is latchable to retaining ring 12 by means of a latching connection R'.

In the example shown, each of retaining members 10' further includes a latching-type connecting element 103" in the form of a flexible tongue. This latching-type connecting element 103" is disposed in the respective latching-type connecting element 103' configured as an opening. This tongue-shaped, latching-type connecting element 103" is designed to latchingly engage with an edge of retaining ring 12. To this end, first, the latching-type connecting element 103' in the form of the opening is engaged onto mating latching-type connecting element 104' and then displaced relative to the latter so that mating latching-type connecting element 104' is moved along the opening until the thereby elastically flexed tongue-shaped, latching-type connecting element 103" snaps over the edge of retaining ring 12 (and returns to the shape it had prior to assembly). In this way, retaining member 10' is locked in place on retaining ring 12 and securely held thereto.

It should be noted that, for example, simple non-latching form-fitting connections could also be used instead of latching connections R'.

Adjacent to each of mating latching-type connecting elements 104', retaining ring 12 each has two parallel walls, which prevent the retaining members 10' from tilting, thus facilitating proper alignment of retaining members 10'.

As can be seen from FIGS. 5 and 6, retaining ring 12 has the shoulder 110, which extends continuously around the inner circumference thereof. Optionally, an entry bevel E is provided (alternatively, a securing portion in the form of an inwardly directed projection which is smaller compared to step 110), which entry bevel makes it easier to move retaining ring 12 over body 30 (or, in the case of the securing portion, to latch it to the body), so that it surrounds body 30 on the outside. For assembly, first, retaining ring 12 is mounted on body 30, which is then screwed to housing 31. Or retaining ring 12 is placed on housing 31, and body 30 is screwed onto housing 31 therein. Furthermore, prior or subsequent to this, retaining members 10' are mounted on retaining ring 12. Finally, cable 2 is clamped by tightening screws 13.

Thus, tensile forces acting on cable 2 are transferred to body 30 by means of strain relief device 1; 1'. In this process, the tensile forces are transferred from clamping portions 101 via connecting portions 102 into attachment portion 11; 11'.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE CHARACTERS

1; 16 strain relief device
10; 10' retaining member
100; 100' retaining portion
101 clamping portion
102 connecting portion
103; 103', 103' latching-type connecting element
104; 104€ mating latching-type connecting element
105 hole
106 form-fit portion
107 securing portion
108 guide element
109 guide receptacle
11 attachment portion
110 shoulder
12 retaining ring
13 screw
14 nut
2 cable
3 assembly
30 body (nut)
300 threaded portion
301 form-fit portion
31 housing
E entry bevel
R; R' latching connection
S1, S2 location

The invention claimed is:

1. A strain relief device for a cable, comprising:

two identically or similarly configured halves each comprising a separately formed and identically configured retaining member mountable via an attachment portion to a body and/or housing connectable to the cable, each of the halves having a clamping portion, wherein the attachment portion is spaced apart from the clamping portions, wherein the clamping portions are configured to clamp the cable therebetween, wherein each retaining member comprises a latching-type connecting element comprising a flexible tongue and an opening, the flexible tongue being disposed in the opening, wherein each flexible tongue is configured to latchingly engage with an edge of a retaining ring of the attachment portion, and wherein the opening is engageable onto a mating latching-type connecting element and displaceable relative to the mating latching-type connecting element so as to move the mating latching-type connecting element along the opening to snap the flexible tongue over the edge of retaining ring.

2. The strain relief device of claim 1, wherein a retaining portion of each of the retaining members is connected to the respective clamping portion via a connecting portion.

3. The strain relief device of claim 2, wherein the retaining portions of the retaining members together form the attachment portion.

4. The strain relief device of claim 2, wherein the retaining portion of each of the retaining members comprises the latching-type connecting element, which is latchingly engageable with the mating latching-type connecting element of the respective other retaining member to create a respective latching connection.

5. The strain relief device of claim 2, wherein the retaining portion of each of the retaining members is mountable to the retaining ring.

6. The strain relief device of claim 5, wherein the retaining portion of each of the retaining members is latchable to the retaining ring by a latching connection.

7. The strain relief device of claim 2, wherein the connecting portion is flexible.

8. The strain relief device of claim 1, wherein the attachment portion comprises a circumferential shoulder.

9. The strain relief device of claim 1, wherein the attachment portion is annular in shape.

10. The strain relief device of claim 1, wherein the clamping portion of each of the retaining members has two holes.

11. The strain relief device of claim 10, wherein two screws are passable through two respective opposite holes in the two retaining members.

12. The strain relief device of claim 11, wherein the screws are threadedly engageable by nuts to tighten the clamping portions against each other, and wherein the clamping portions have form-fit portions for non-rotatably receiving the nuts.

13. The strain relief device of claim 1, wherein each of the retaining members is formed as a single piece.

14. The strain relief device of claim 1, wherein the retaining members are fixable relative to each other by at least two latching connections.

15. The strain relief device of claim 14, wherein the retaining members are latchable together by the at least two latching connections.

16. An assembly, comprising:

a body that is mountable on a cable, and/or a housing that is mountable on a cable; and the strain relief device of claim 1.

17. The assembly of claim 16, wherein the strain relief device is mounted on the body and/or housing by the attachment portion, and wherein the cable is clampable between the clamping portions, which are tightenable against each other.

18. The assembly of claim 16, wherein the body comprises a nut threaded to the housing.

* * * * *